No. 707,009. Patented Aug. 12, 1902.
C. REINHARDT.
METHOD OF TESTING EGGS.
(Application filed Aug. 17, 1901.)
(No Model.)
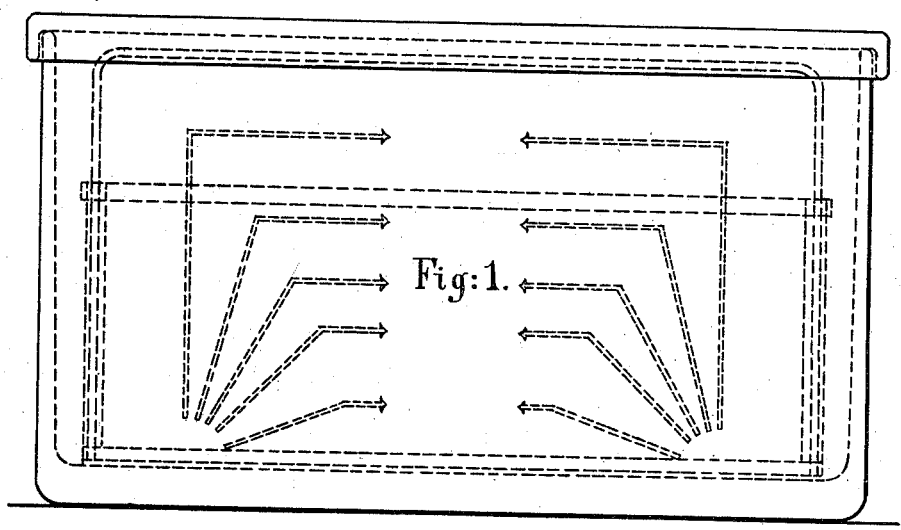
Fig: 1.
Fig: 3.
Fig: 2.
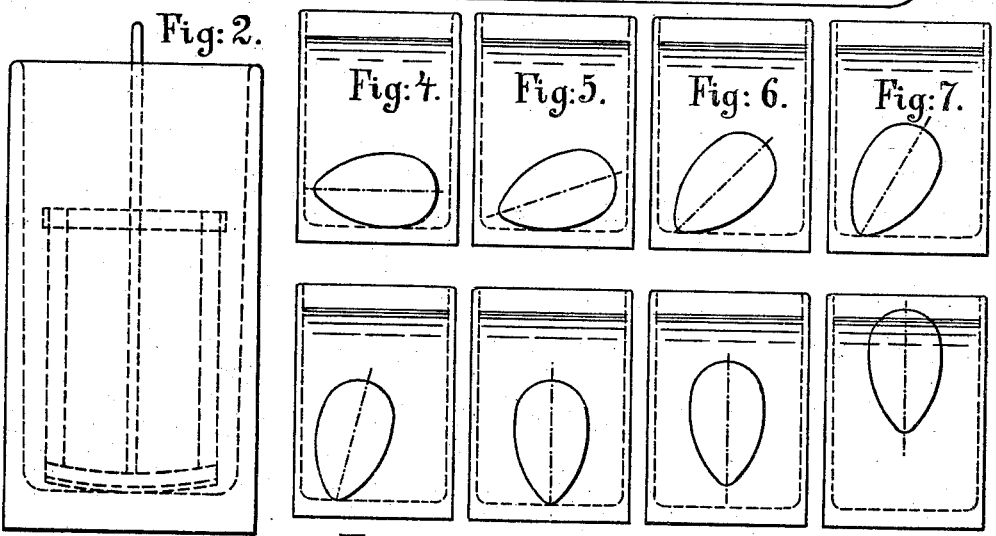
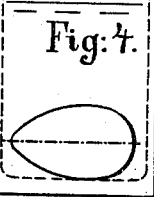  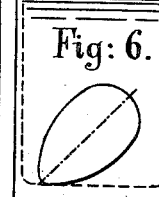 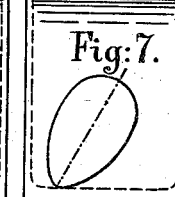
Fig: 4.   Fig: 5.   Fig: 6.   Fig: 7.
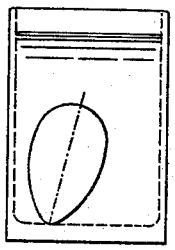 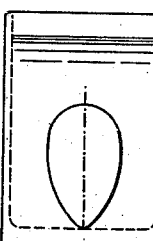 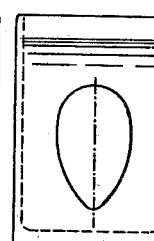 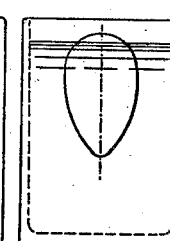
Fig: 8.   Fig: 9.   Fig: 10.   Fig: 11.
Witnesses
Chas. H. Smith
J. Staib
Inventor
Carl Reinhardt
per L. W. Serrell & Son
Attys
THE NORRIS PETERS CO., PHOTO-LITHO., WASHINGTON, D. C.

UNITED STATES PATENT OFFICE.

CARL REINHARDT, OF KAISERSLAUTERN, GERMANY.

METHOD OF TESTING EGGS.

SPECIFICATION forming part of Letters Patent No. 707,009, dated August 12, 1902.

Application filed August 17, 1901. Serial No. 72,396. (No specimens.)

*To all whom it may concern:*

Be it known that I, CARL REINHARDT, a subject of the King of Bavaria, and a resident of Kaiserslautern, in the Kingdom of Bavaria, German Empire, have invented new and useful Improvements in Methods of Ascertaining the Age of Eggs, of which the following is a specification.

This invention refers to improvements in the method of ascertaining the age of eggs, and has for its object the composition of a liquid of a certain specific weight. Into such liquid the eggs are placed, so as to allow them to take the proper position, either horizontally on the flat bottom of the vessel containing said liquid, or at an acute angle of more or less inclination, or vertically on said bottom, or suspended in the liquid, or even swimming on or near the level of the said liquid. Either one of these positions will be taken by the egg to be tested, and the position taken will indicate the age or in some cases the condition of the egg.

I am well aware that egg-testers have been used heretofore and especially such in which the transparency of the egg offered the means for ascertaining to a certain degree the age or rather the condition of the egg. In such testers the rays of light, reflected by a mirror, have been made use of and such test rendered good assistance to ascertain, in case the transparency of the egg was unobstructed, that the egg was good for use or in case the transparency of the egg was partly or fully obstructed that the use of such egg was doubtful. However, this method of testing eggs did not offer accuracy enough in all cases for ascertaining whether the egg, although pretty clear in its transparency, was fit or worthy for preservation or for hatching or for all those purposes in which fresh eggs or eggs not beyond a certain age only should be used. Now my method does offer the means for ascertaining not only the condition, but within certain limits the age of the egg under test.

I shall first describe the composition of the liquid and hereinafter the manner in which I make use of such liquid for my purposes. The liquid ought to be of about 1.035 specific weight. In order to obtain such liquid, I add to one liter of water twenty-five grams of ordinary salt, eighty-five grams of glycerin of about 28° Baumé, and one gram of concentrated salicylic alcohol. After dissolving of the salt and well mixing of all the ingredients my liquid is ready for use, and I am now enabled to ascertain the age of each egg plunged into it. A fresh egg will go to the flat bottom of the vessel containing the liquid and will lie there in an almost horizontal position, an egg of three to five days age will take a position in which the imaginary longitudinal axis of the egg describes an angle of about twenty degrees to said bottom, an egg eight days old will describe an angle of about forty-five degrees, a fourteen-days' egg of about sixty degrees, and a three-weeks' egg will describe an angle of about seventy-five degrees. An egg of four weeks' age will stand upright on its pointed end, a five weeks' egg will be suspended in the liquid, whereas an egg beyond that age or a foul egg will swim on or near the level of the liquid. By these facts everybody may easily ascertain the age of eggs, which will prove to be very useful for cooking, preserving, hatching, and all other purposes.

In order to facilitate the test of ascertaining the age of eggs by means of the liquid of a certain specific weight, I propose to use a vessel containing said liquid, into which the egg or eggs to be tested may easily be plunged and the age ascertained. The vessel of any suitable shape is made of glass or of a framing the sides of which are closed by glass panels. Upon either one or more of these glass sides the different ages are marked by horizontal lines, and each line has its specific index.

Figure 1 is a side view, Fig. 2 is an end view, and Fig. 3 is a plan, of a vessel made of glass. The lines of mark begin at a certain height above the flat bottom of the vessel, and the vessel is filled up with the liquid of certain specific weight to such level, so as to allow eggs of a certain age to freely swim in the said liquid. It will easily be understood that the position which the immerged egg or eggs take may in this manner be easily controlled and the age of the same ascertained. Fig. 4 shows the position of a fresh egg within the liquid of the specific gravity mentioned above; Fig. 5, the position of a three to five days' egg, (about twenty degrees;) Fig. 6, the position of an eight-days' egg, (about forty-five degrees;) Fig. 7, the position of a fourteen-days' egg, (about sixty degrees;) Fig. 8, the position of a three-weeks' egg, (about seventy-five degrees;) Fig. 9, the position of a four-weeks' egg, (upright;) Fig. 10, the position of a five-weeks' egg, (suspended;) Fig. 11, the position of an egg beyond that age, (swimming.)

In order to avoid the hand of the operator to have to dip into the liquid, I may provide a plate with proper uprights and handle, upon which the egg or eggs is or are placed and are dipped into the liquid by means of such plate. The latter may be of such size so as to allow its easy dipping into the liquid or it may be finely perforated, so as to allow the liquid to penetrate through its perforations while the plate is immerged with the eggs into the liquid.

I wish it to be understood that I do not confine my invention to the exact use of the ingredients or to the quantities named, as I may vary at will such ingredients and the quantities used, the main thing being to prepare and use a liquid of such specific weight that the eggs of different ages will take different positions within such liquid in order to ascertain their ages by such difference in the positions; but I wish to remark that the liquid constituted by the ingredients named and by the quantities in which these ingredients are used has these particular advantages above a solution of common salt: that it is of long durability and not liable to any material changes in the way of evaporation, crystallization, or becoming turbid.

I claim—

The new and improved method herein described for ascertaining the age and condition of an egg or eggs, consisting in preparing a liquid by adding glycerin, common salt and salicylic alcohol to water in or about in the proportions mentioned, so as to obtain a liquid of about 1.035 specific weight and immersing the eggs to be tested in said liquid in proximity to a series of lines or marks which with the position assumed by the eggs in the liquid indicates the age or condition thereof.

In testimony that I claim the foregoing as my invention I have signed my name, in presence of two witnesses, this 11th day of July, 1901.

CARL REINHARDT.

Witnesses:
PETER FREY,
MICHAEL ZIMMERMANN.